US005477213A

United States Patent [19]

Atarashi

[11] Patent Number: 5,477,213

[45] Date of Patent: Dec. 19, 1995

[54] DATA INPUT DEVICE FOR IC-KEY LOCK SYSTEM

[75] Inventor: Keiji Atarashi, Higashimatsuyama, Japan

[73] Assignee: Zexel Corporation, Tokyo, Japan

[21] Appl. No.: 142,959

[22] Filed: Oct. 29, 1993

[30] Foreign Application Priority Data

Nov. 10, 1992 [JP] Japan .................................... 4-324743

[51] Int. Cl.$^6$ ............................... G06F 7/04; G06K 7/01; E05B 49/00

[52] U.S. Cl. ................................. 340/825.31; 235/382.5; 70/277

[58] Field of Search ......................... 340/825.31, 825.54, 340/825.34; 70/271, 277, 278; 235/382, 382.5

[56] References Cited

U.S. PATENT DOCUMENTS

| | | | |
|---|---|---|---|
| 4,727,368 | 2/1988 | Larson et al. | 340/825.31 |
| 4,743,898 | 5/1988 | Imedio | 340/825.31 |
| 5,014,049 | 5/1991 | Bosley | 340/825.31 |
| 5,140,317 | 8/1992 | Hyatt et al. | 340/825.31 |

FOREIGN PATENT DOCUMENTS

| | | |
|---|---|---|
| 0243586 | 11/1987 | European Pat. Off. . |
| 0497040 | 8/1992 | European Pat. Off. . |
| 00091 | 1/1980 | WIPO . |

OTHER PUBLICATIONS

Locksmith Ledger, vol. 49, No. 5, 1 Apr. 1989; Phillips, B.; "Kaba Nova: a self–contained system with no hardwiring".

*Primary Examiner*—Alyssa H. Bowler
*Assistant Examiner*—Mark H. Rinehart
*Attorney, Agent, or Firm*—Sughrue, Mion, Zinn, Macpeak & Seas

[57] ABSTRACT

A data input device for beforehand inputting ID data into a locking device in a locking system, including a data input unit for generating data to be preset in the locking device, an IC key type of connector which is connected to the data input unit and has the same shape as an IC key, serving as an interface like the IC key, and through which data can be supplied from the data input unit to the locking device, and a lock control unit provided in the locking device, for receiving and storing the data supplied from the data input unit when the IC key type of connector is inserted into a reader/writer of the locking device. When the stored ID data is coincident with ID data transmitted from the IC key, the lock control unit releases the lock of the locking device.

4 Claims, 3 Drawing Sheets

DATA INPUT DEVICE FOR IC-KEY LOCK SYSTEM

BACKGROUND OF THE INVENTION

1. Field of the Invention

This invention relates to a data input device for an IC-key lock system for electrically releasing the lock of a door, a gate or the like using a key equipped with an integrated circuit (IC) (hereinafter referred to as "IC key").

2. Description of the Related Art

A lock system for releasing the lock of a door by inserting a magnetic card or an IC key into a slot for to a locking device of the door has been widely used for hotels, etc. In such a lock system, ID data which is inherent to the locking device of the door is required to be preprogrammed or preset in the lock device before the lock system is actuated. A conventional data input method for satisfying the above requirement will be described with reference to FIG. 1.

In FIG. 1, a reference numeral 1 represents a door, and the door 1 is provided with a locking device (gate device) 3. The locking device 3 is provided with a slot 5 into which a magnetic card or an IC key is inserted, and further provided therein with a connector 7 for ID data input. Ordinarily, the connector 7 is hidden by a connector cover 9 which is secured to the connector 7 by a screw. For setting of ID data in the locking device 3, the connector cover 9 is detached from the connector 7, and a connector 13 of a data input unit 11 is connected to the connector 7 to input the ID data from the data input unit 11. By this data input operation, the ID data is set in a control circuit of the locking device 3.

This conventional data input method has a problem in that the operation of connecting the data input unit 11 to the locking device 3 is troublesome. That is, this method requires a troublesome operation of detaching the screwed connector cover 9, and further requires the handling of the detached connector cover 9 and the screw, particularly during the execution of the operation. In addition, a reader/writer connection point in the slot 5 for the magnetic card or IC key is designed to have such rigidity that it is endurable for highly frequent and severe use conditions, however, the connectors 7 and 13 are not designed to have such rigidity. Accordingly, the connection of the connectors 7 and 13 must be carried out very delicately.

SUMMARY OF THE INVENTION

An object of the present invention is to provide a data input device for an IC key lock system through which ID data can be input into a locking device by a simple operation.

In order to attain the above object, according to this invention, a data input device for use in an IC key lock system in which the lock of a locking system is released by inserting an IC key into a reader/writer of the locking system, includes a data input unit for generating data to be preprogrammed or preset in the locking device, an IC key type of connector which is connected the data input unit and serves as an interface like the IC key for the reader/writer and through which the data can be supplied from the data input unit to the reader/writer, and a lock control unit provided to the locking device, for receiving the data supplied from the data input unit through the reader/writer when the IC key type of connector inserted into the reader/writer and storing the received data, whereby the data to be preprogrammed in the locking device is input into the locking device.

According to the data input device of this invention, when the ID data is set in the locking device from the data input unit, the IC key type of connector of the data input unit is inserted into the reader/writer for IC key of the locking device, and the data is input from the data input unit. The lock control unit in the locking device receives the ID data from the data input unit through the reader/writer for IC key, and the received ID data is stored in the lock control unit.

DETAILED DESCRIPTION OF THE PREFERRED EMBODIMENT

Figure 1:
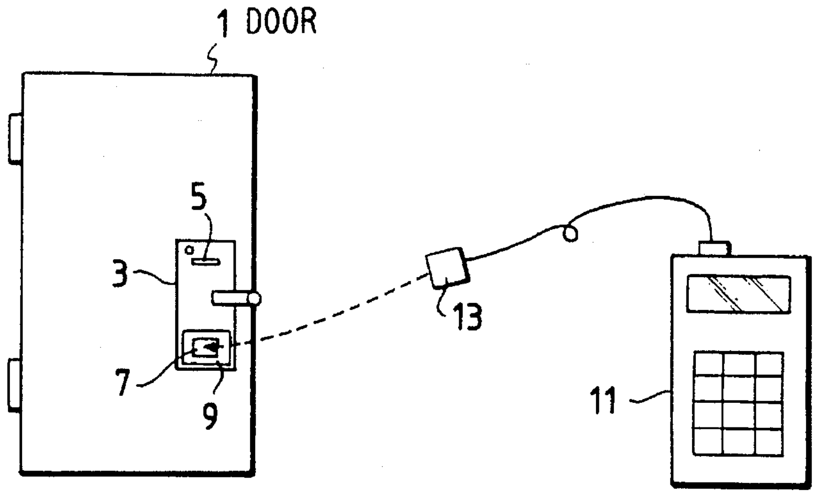
FIG. 1 PRIOR ART
FIG. 1 shows the outline of a conventional lock system to explain a conventional data input method.
Figure 2:
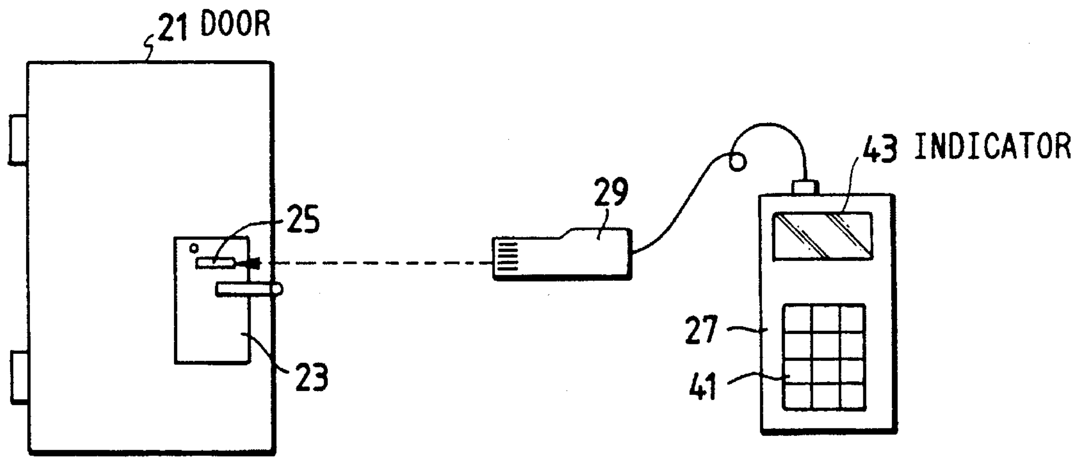
FIG. 2 shows the outline of an embodiment of a data input device for an IC key lock system according to the present invention.
Figure 3:
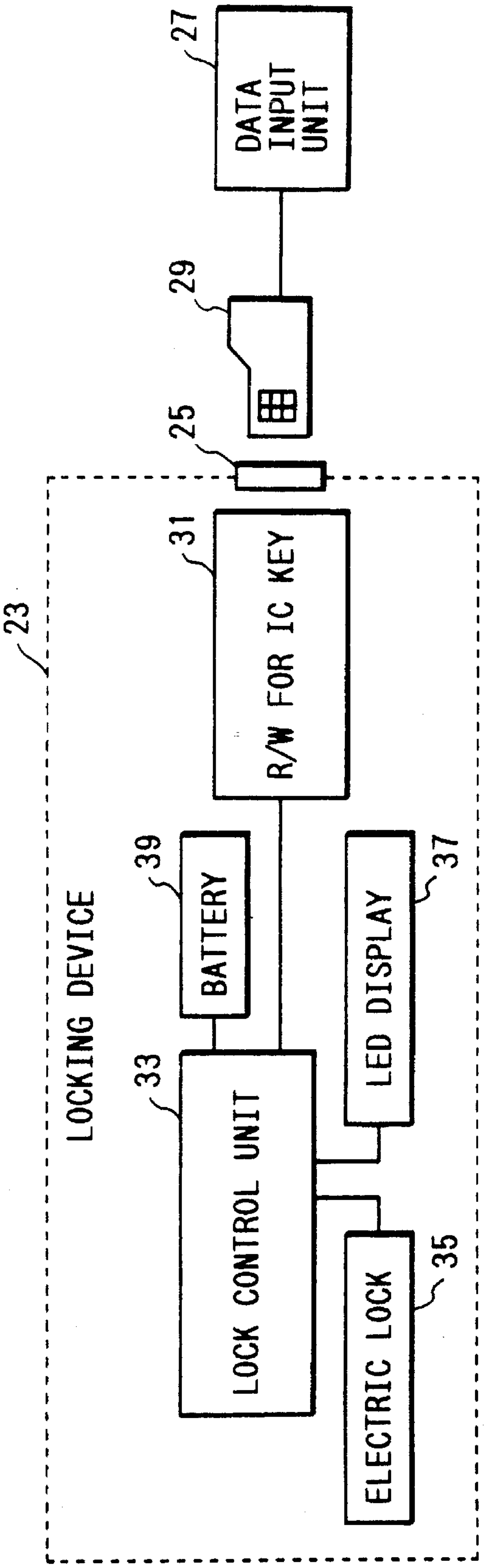
FIG. 3 is a block diagram showing the construction of the embodiment.

A preferred embodiment according to this invention will be described with reference to the accompanying drawings. FIG. 2 shows the outline of an embodiment of the data input device according to this invention, and FIG. 3 is a block diagram showing the construction of the embodiment.

As shown in FIG. 2, a locking device which is secured to a door 21 is provided with a slot 25 into which an IC key is inserted. As shown in FIG. 3, the locking device 23 is further provided therein with an IC-key reader/writer 31 which is electrically connected to the IC key inserted through the slot 25 to thereby perform data communication between the locking device 23 and the IC key. The reader/writer 31 is connected to a lock control 33, which comprises a micro-computer, for example, and serves to control the entire operation of the locking device 23.

The lock control unit 33 is further connected to an electric lock 35, an LED display 37 for displaying an operating status and a battery 39 serving as a power source. The lock control unit 33 contains a memory (not shown) in which the ID data is stored. The lock control unit 33 carries out the data communication with the IC key through the reader/writer 31 when the IC key is inserted into the slot 25, and releases the electric lock 35 when the ID data transmitted from the IC key is coincident with the ID data which has been previously stored in the memory.

A data input unit 27 for preprogramming the ID data into the locking device 23 thus constructed has an IC-key type of connector 29 which has the same shape as the IC key. The IC-key type of connector 29 has no IC chip thereon unlike the IC key, however, serves as an interface like the IC key for the reader/writer 31, thereby enabling the data communication through the reader/writer 31 between the lock control unit 33 and the data input unit 27. By manipulating an input key of the data input unit 27 in the same procedure as the conventional data input method in a state where the IC-key type of connector 29 is inserted into the slot 25 of the locking device 23 and connected to the reader/writer 31, the ID data is transmitted through the reader/writer 31 to the lock control unit 33, and set into the memory inside of the lock control unit 33.

Figure 4:
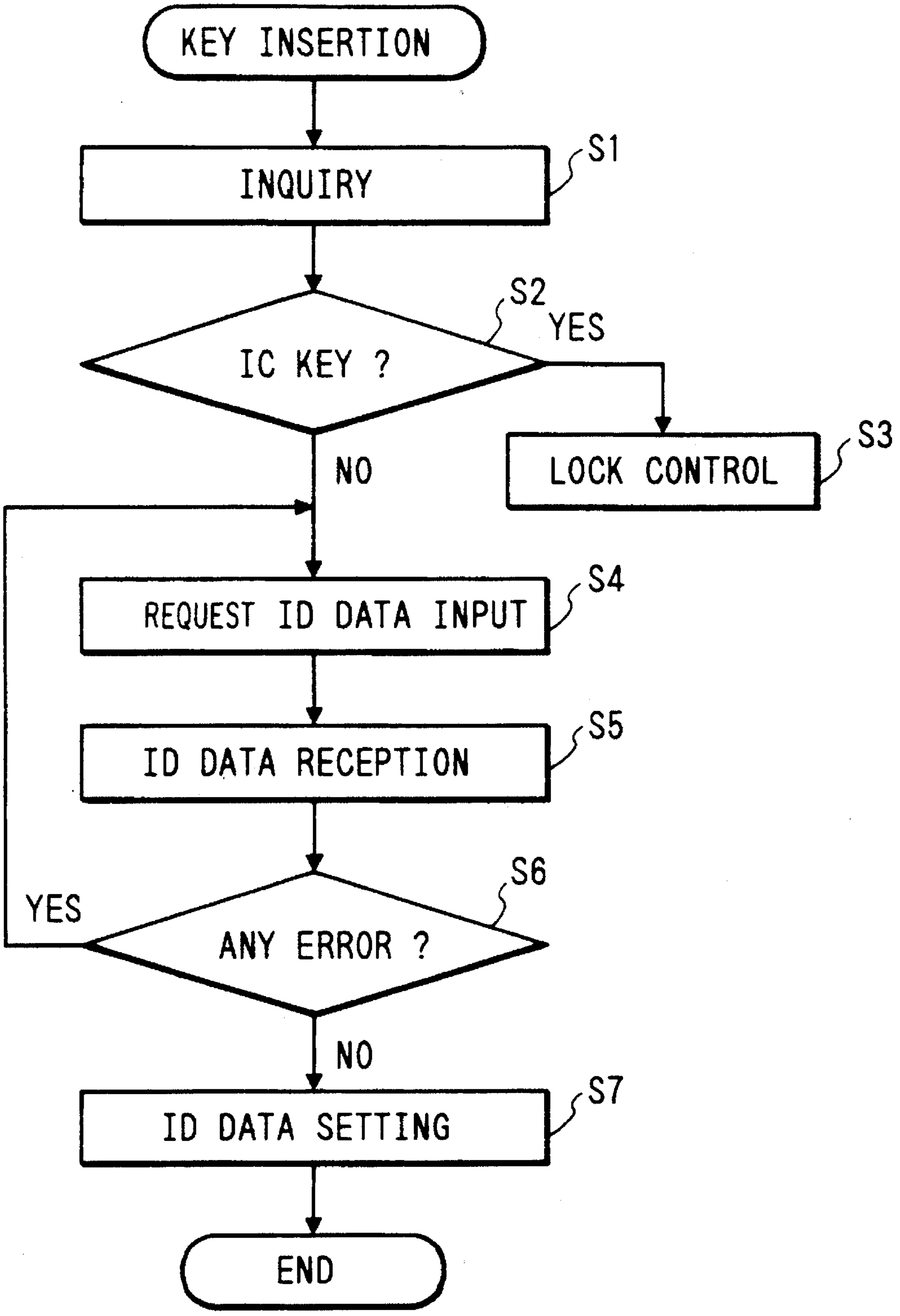
FIG. 4 is a flowchart showing the operation of a lock control unit of the embodiment.

FIG. 4 is a flowchart for the operation of the lock control unit 33. When the IC key or the IC-key type of connector 29 of the data input unit is inserted into the slot 25 and connected to the reader/writer 31, first, the control unit 33 inquires about the identification of the inserted member (i.e., the IC key or the IC-key type of connector) (S1). On the basis of the response to this inquiry, the control unit 33 judges which member is inserted, the IC key or the IC-key type of connector of the data input unit 27 (S2). If the IC key is judged to be inserted, a well-known lock releasing control operation is carried out (S3). On the other hand, if the IC-key type of connector of the data input unit 27 is judged to be inserted, the control unit 33 requests ID data transmission to the data input unit 27 (S4). Upon reception of this instruction by the data input unit 27, this instruction is indicated on a liquid crystal display 43 (see FIG. 2), and thus an operator pushes a key 41 on the data input unit to transmit any ID data. This ID data is transmitted through the reader/writer 31 to the control unit 33 (S5). If no error exists in the ID data (S6), this ID data is stored in the memory of the control unit 33 (S7). Subsequently, the lock control when the IC key is inserted is carried out using this ID data (S3).

As described above, according to this invention, the data input can be carried out by inserting the IC-key type of connector of the data input unit into the IC-key slot of the locking device at the door side, so that the data input work is easily carried out and thus a working time can be shortened. In addition, through the detachment and insertion of the connector, the connector of this invention suffers less damage than the conventional connector, and thus reliability is higher. Further, no special connector is required at the locking device side, and thus the cost can be more reduced.

What is claimed is:

1. A data input device for use in an IC key lock system in which the lock of a locking system is released by inserting an IC key into a reader/writer of the locking system, comprising:

a data input unit for generating data to be preset in said locking system;

an IC key type of connector which is connected to said data input unit and serves as an interface like said IC key for said reader/writer and through which the data is supplied from said data input unit to said reader/writer; and a lock control unit, provided in said locking system, for receiving the data supplied from said data input unit through said reader/writer when said IC key type of connector is inserted into said reader/writer and storing the received data, whereby the data which is preset in the locking system is input into said locking system, said lock control unit including access means for accessing a member inserted in said locking device just when the member is inserted into said locking device, to inquire about whether the member is an IC key or an IC-key type connector, and request means for requesting said data input unit to transmit the data into said lock control unit when the inserted member is judged to be the IC-key type connector.

2. The data input device as claimed in claim 1, wherein said lock control unit judges whether the stored data is coincident with an ID data transmitted from said IC key, and releases the lock of said locking system if the stored data is judged to be coincident with the ID data.

3. The data input device as claimed in claim 1, wherein said IC-key type of connector has the same shape as said IC key.

4. The data input device as claimed in claim 1, wherein said data input unit includes a liquid crystal display for displaying information on data transmission between said locking system and said data input unit.

* * * * *